United States Patent [19]

Seehausen

[11] Patent Number: 4,703,774

[45] Date of Patent: Nov. 3, 1987

[54] SUBSEA SAFETY CHECK VALVE SYSTEM

[75] Inventor: Randall R. Seehausen, Ventura, Calif.

[73] Assignee: Vetco Gray Inc., Houston, Tex.

[21] Appl. No.: 805,028

[22] Filed: Dec. 4, 1985

[51] Int. Cl.⁴ .............................................. F16L 29/00
[52] U.S. Cl. ................................ 137/614.04; 137/614; 137/614.17; 285/25
[58] Field of Search .............. 137/614, 614.03, 614.04, 137/614.05, 614.17; 285/25

[56] References Cited

U.S. PATENT DOCUMENTS

| | | | |
|---|---|---|---|
| 1,944,124 | 1/1934 | Goodman | 137/614.05 X |
| 3,570,543 | 3/1971 | Ekman | 137/614.04 X |
| 3,730,221 | 5/1973 | Vih | 137/614 |
| 3,777,771 | 12/1973 | De Visscher | 137/614 X |
| 4,460,156 | 7/1984 | Hazelrigg et al. | 137/614.04 X |
| 4,549,577 | 10/1985 | Kugler | 137/614.05 X |
| 4,582,295 | 4/1986 | Kugler et al. | 137/614.04 X |

FOREIGN PATENT DOCUMENTS 861729  2/1961  United Kingdom ........... 137/614.04

*Primary Examiner*—A. Michael Chambers
*Assistant Examiner*—John C. Fox
*Attorney, Agent, or Firm*—Joseph R. Dwyer

[57] ABSTRACT

A check valve system (10) with a fail-safe valve (FSC) comprising either a pair of oppositely acting, oppositely facing, one-way check valves (V1 and V2) located at the interface (42) between two connecting numbers (36, 40), or a shuttle valve (206) and stab (232), for controlling the flow of fluid through the connector members at the member interface. Said valves (V1, V2, and 206) are closed by spring bias when the members are separated but which are mechanically opened when said members engage one another to permit the flow of pressure fluid through the members. The fail-safe valve (FSC or FSCa) is a one-way check valve in one of the check valves (V2) closed against pressure fluid, when said members are joined, but which will open to relieve any pressure which might be trapped in control lines (12a) when the members become disconnected. The members are disclosed as part of a connector (16) and a mandrel (20), and as part of a tree (200), tree cap (202), or running tool.

19 Claims, 9 Drawing Figures

SUBSEA SAFETY CHECK VALVE SYSTEM

BACKGROUND OF THE INVENTION

This invention relates to equipment for drilling and producing from a subsea oil or gas well and is particularly directed to an improvement in the connection between the various pieces of equipment to prevent the intrusion of sea water into the equipment's hydraulic control conduits (lines) and to prevent hydraulic lock of certain valve actuators (as a fail-safe feature) in the event of an emergency or accidental disconnection of various pieces of equipment.

This invention will first be described as part of a connector and mandrel application used to connect the various pieces of equipment together and then later the invention will be described as part of a tree cap or running tool application which intrusion of sea water and hydraulic lock are also problems. Thus, by way of example, the equipment used to produce from a subsea well conventionally includes a completion tree which is connected to the wellhead located at or near the mudline, a control module containing various actuators for controlling valves located on the completion tree and within the well itself, and, finally, a tree cap having a plurality of hydraulic control lines for connecting the various actuators in the control module, the tree, and in the well itself to a rig located at the water level. From time to time a running tool will also be used to service the well, if need be.

The connectors used in connecting the tree to the wellhead, the control module to the tree, etc., each have hydraulic control lines extending therethrough which mate with similar hydraulic control lines in a member such as a mandrel on the tree, control module, etc., so that the fluid under pressure may be directed to the various valve actuators. Thus, all control lines are connected between each piece of equipment and between the equipment and the well via the connector and a mandrel.

These connectors have a cone shaped surface which will mate with a complementary cone shaped surface on the mandrel, and suitable sealing devices carried by the connector and positioned to seal the control lines at their mating surfaces, sometimes called the "member interface," to prevent leakage of the fluid along the member interface. A typical cone seal connector with its cone seal is illustrated, described, and claimed in the Pfeifler U.S. Pat. No. 4,440,423 to which reference be made for more details. See also the improved cone seal as disclosed and claimed in the U.S. patent application Ser. No. 727,658, filed April 26, 1985 by James Albert and James Dean, which also may be used with this invention.

For the purposes of this description, the connector with its cone surface may be referred to as the "female member" or "movable member" to indicate the fact that normally the connector is lowered and connected onto the mandrel which has a complementary cone surface which may be referred to as the "male member" or "semi-permanent member." These members are also referred to as a "cap member" and "head member", respectively, in the Pfeifler patent.

It is to be understood that while this invention is described in connection with well production equipment, this invention is also usable with well drilling equipment.

The problem that arises and the solution to which this invention is directed involves an emergency or accidental disconnection of one of the members. Such a disconnection would normally allow the intrusion of sea water into the hydraulic control lines thereby contaminating the fluid. To solve this problem in a connector and mandrel interconnection, one-way check valves are located at the member interface. These one-way check valves are mechanically opened for the flow of fluid pressure and are spring actuated to close in the event of disconnection of the connector, thereby preventing the intrusion of sea water into the hydraulic lines. According to this invention, these one-way check valves are formed in such a manner that only a minute amount of sea water is allowed to intrude.

There is another problem, however, the solution to which this invention is also directed. That is the problem of hydraulic lock that may occur upon the emergency or accidental disconnection of the connector and closing of the one-way check valves. For example, in the event that one of the control valves regulating the flow of oil from the well has been hydraulically actuated to an open condition by the rig operator. Upon disconnection, this control valve will be locked open by the function of the one-way check valve system of the disconnected connector. This could be catastrophic because the control valve is locked open and out of the control of the rig actuator. To solve this problem, a second one-way valve, preferably located in one of the one-way check valves, will vent the high pressure fluid holding the control valve locked open to sea water thereby allowing the locked control valve to close and shut off the flow of fluid from the well.

It can be seen, therefore, that it is an object of this invention to provide a system for subsea control lines to prevent any water intrusion and with a fail-safe close feature in the event of an accidental or emergency disconnection of various subsea equipment.

SUMMARY OF THE INVENTION

The invention which attains the foregoing object in a connector and mandrel application, comprises a pair of oppositely acting, oppositely facing, one-way check valves located at the interface between two mating surfaces of connector members which valves are closed by spring bias when the connector members are separated but which have protruding noses which engage one another when the mating surfaces are engaged to mechanically move and hold the check valves open to permit the flow of fluid through the connector members. In the preferred embodiment, one check valve is also provided with an oppositely acting one-way safety check valve mechanically closed against the fluid pressure but which will open to relieve trapped locking pressure between the one check valve and a subsea valve if the mating surfaces become disconnected and if the locking pressure is higher than ambient pressure. In this embodiment, the amount of sea water intrusion, during connector remating, amounts to no more volume than the volume of the nose protrusion in each control line at the member interface.

Utilizing the same inventive concept of openable valves, in a tree cap/running tool application, stabs mechanically open shuttle valves for pressure fluid flow from rig control lines. These shuttle valves are provided with a one-way safety check valve mechanically closed against the fluid pressure but will open to release any trapped locking pressure.

DETAILED DESCRIPTION

Figures 1, 2:
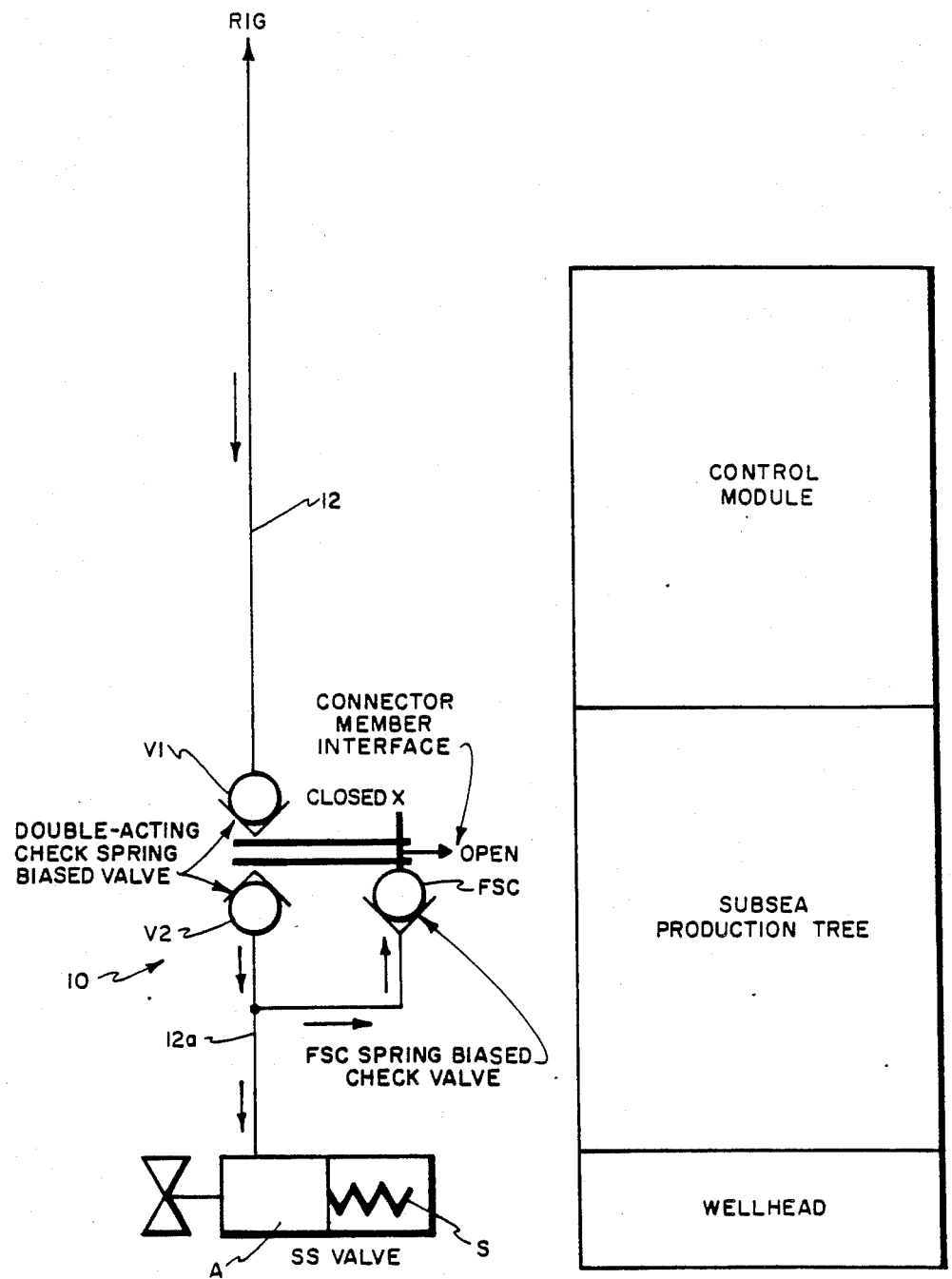
FIG. 1 is a schematic illustration of the opposing one-way valves and the manner in which the lock pressure relief valve is connected in the system.
FIG. 2 is a schematic illustration of a typical well completion system.

FIG. 1 is a schematic illustration of the check valve system 10 of this invention connected by a control line 12 and 12a between a rig and an actuator A of a subsea control valve SS. The check valve system 10 comprises a pair of opposed one-way valves V1 and V2 located at a member interface, and a fail-safe-close check valve FSC connected between the check valve V2 and the subsea valve SS. The fail-safe check valve FSC is illustrated connected to ambient pressure when opened, in this case, sea water. Such an opening will occur when the pressure on the subsea valve SS is higher than ambient pressure when the check valve V2 closes due to disconnection at the member interface.

Check valves V1 and V2 and the fail-safe check valve FSC represent the function of the connector between the control module CM and the subsea completion tree T which is represented by the block diagram of FIG. 2.

In this schematic illustration, it can be seen that hydraulic signals from the rig are directed through the double-acting check valves V1 and V2 to the actuator A of the subsea control valve SS. Such double-acting check valves V1 and V2 are held open mechanically when the members are connected together to allow the flow of fluid under pressure from the rig to the subsea valve SS. The fail-safe check valve FSC is closed and fluid therethrough blocked under these conditions. In the event of a disconnect of the female and male members, it will be appreciated that, were it not for the fail-safe check valve FSC, the subsea valve SS would be out of control of the rig actuator and locked in an open position due to high pressure fluid trapped in line 12a between the check valve V2 and the subsea valve FSC. This situation could occur due to inadvertent release of the connector halves resulting from hydraulic fluid failure or operator error. It could also occur due to advertent quick release of the connector halves during environmental emergencies.

Figure 3:
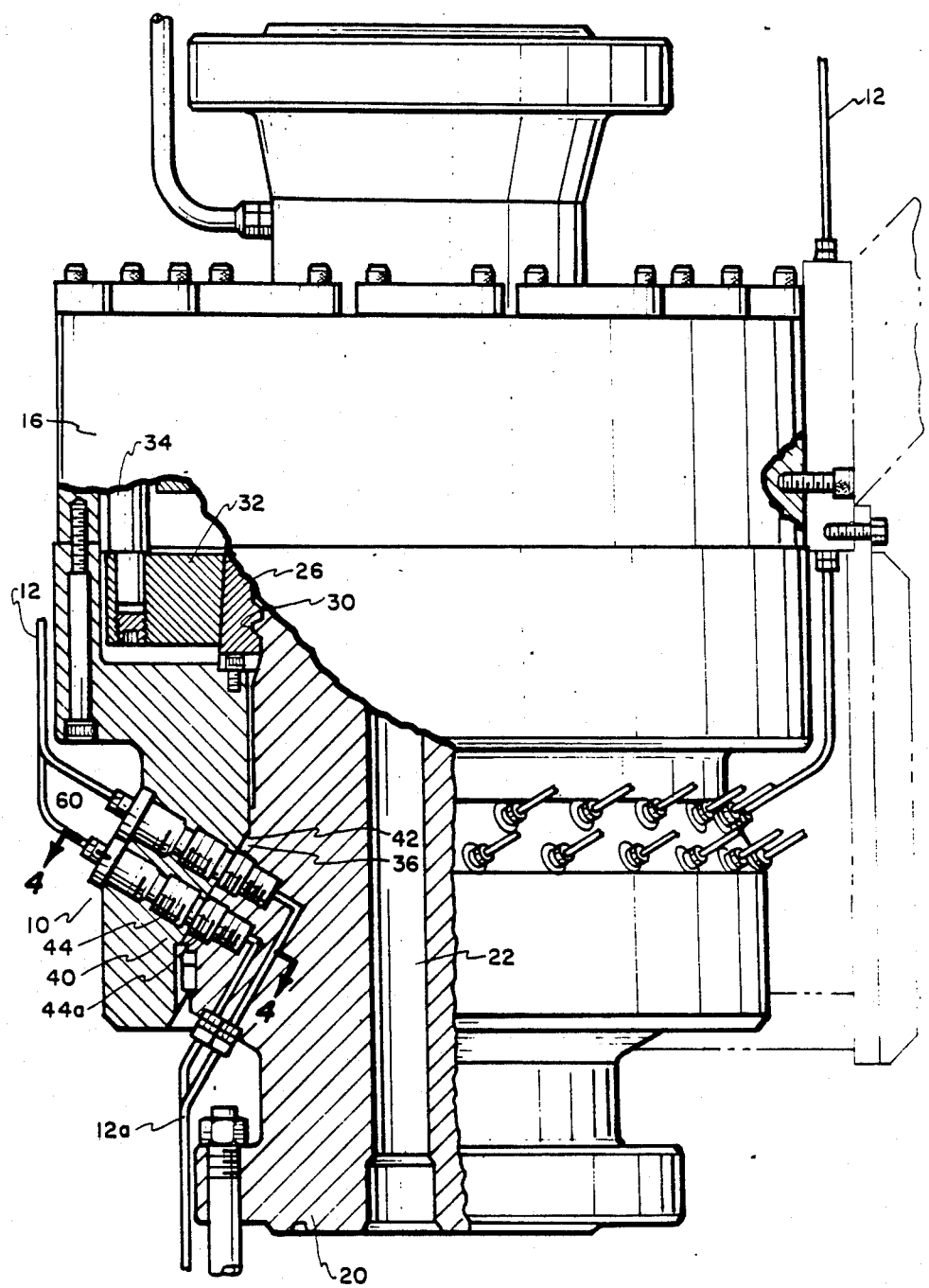
FIG. 3 is an illustration of a connector partially broken away to show the member interface between the conical surfaces, the one-way check valves and control lines.
Figures 4, 5:
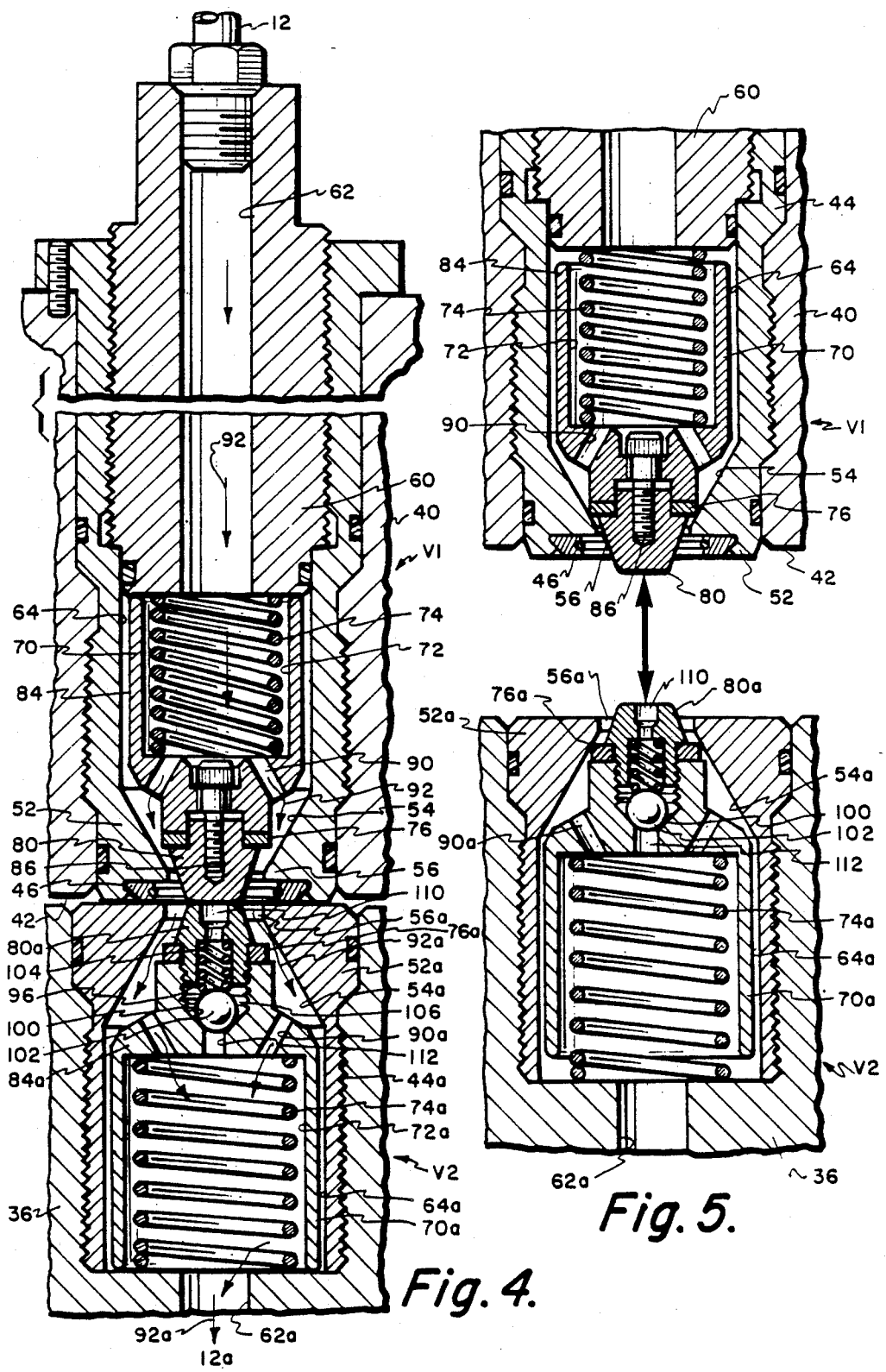
FIG. 4 is an enlarged view of the area taken along line 4—4 of FIG. 3, and shows the one-way check valves in open position.
FIG. 5 illustrates the one-way check valves in closed position when the connector is disconnected.

Before describing the preferred embodiment of the invention in a connector/mandrel application as illustrated in FIGS. 3–5, it is pointed out that this invention will later be described in connection with a tree cap/running tool application in FIGS. 6 and 7, a pressure responsive check valve in FIG. 8 and still another double acting check valve system in FIG. 9. This latter application will be apparent to those skilled in the art after having understood the teaching in FIGS. 3–5.

Thus, FIG. 3 illustrates an otherwise typical connection between a connector 16 and a mandrel 20 except for the addition of the valving system 10 of this invention. As shown, the connector 16 and mandrel 20 have a plurality of production bores 22 (only one being shown) connected between the connector 16 and a mandrel 20 by a stab sub (not shown). Both the connector 16 and the mandrel 20 are flanged to be bolted, respectively, to other equipment. The connector 16 is coupled to the mandrel by dogs 26 which engage a profile 30 on the mandrel. These dogs 26 are actuated by an actuating ring 32 which is actuated by a hydraulically actuated piston 34 only partly shown in this figure.

As can be seen, there are a plurality of control lines 12 joined to the connector 16 and which cross over into the mandrel 20 at the male and female cone surfaces (members 36 and 40 with a member interface 42) between the connector 16 and the mandrel 20 where they are then connected to control lines 12a. Suitable means are provided for proper alignment of the connector and the mandrel.

In the partially broken away section it can be seen that two pairs of such control lines and valve systems 10 of the invention are shown: one of which will now be described in more detail in connection with FIGS. 4 and 5.

FIGS. 4 and 5, as stated above, represent the double acting one-way valves V1 and V2 in their open and closed position. (Both valves V1 and V2 will be described using the same reference numerals with the suffix "a" on valve V1 except where differences have to be denoted by additional reference numerals.)

The female member 40 is bored and threaded to accept a threaded insert 44 which contains a cone seal 46, as above described and claimed in the U.S. Pat. No. 4,440,423, or the improved cone seal of the Albert and Dean application, supra, located at the member interface 42. The male member 36 is blind bored and threaded to accept a threaded insert 44a and, and when fully inserted in the bores, forms an extension of the interface between the two members so that the cone seal 46 will sealingly engage the threaded insert 44a. Both threaded inserts are provided with a thickened end portion 52 and 52a which are conically tapered to form valve seats 54 and 54a with internal openings 56 and 56a.

A second threaded insert 60 which contains an axial bore 62 which is threadably connected to the control line 12. The second threaded insert 60 together with the first threaded insert 44, define a valve cavity 64 containing an axially movable body 70. Valve body 70 has a cup-shaped cavity 72 containing a helical spring 74 which urges the valve body toward a closed position where a seal disc 76 will engage the conical valve seat 54. This valve body 70 is provided with a conical nose 80 which is sized with respect to this valve seat 54 so that the nose 80 will extend outwardly beyond the member interface 42 when the two members are separated, as illustrated in FIG. 5. The valve body 70 is opened by a similarly formed nose cone 80a on valve V2 in the male member 36 as illustrated in FIG. 4.

The nose valve body 70 is formed in two parts so that the nose 80, may be connected thereto by a machine screw 86 to facilitate manufacture.

Thus, when this valve V1 is open, fluid pressure in control line 12 may flow through the bore 62 in the insert 60 through the cup shaped cavity 72 containing the helical spring 74 and out through a plurality of ports 90 in the valve body itself and out past the member interface 42 to valve V2. This flow is represented by arrows 92 and 92a.

The valve V2 is similar to the first described valve V1. Thus, valve V2 has a similarly sized conical nose 80a engaged with a conical valve seat 54a in a similar manner. A helical spring 74a in a cup-shaped cavity 72a urges the valve body 70a toward its valve seat. The valve cavity 64a in this embodiment is formed by the single threaded insert 44a in the male member.

Thus, when valve V2 is open against the bias of spring 74a as illustrated in FIG. 4, fluid flowing from valve V1 flows past the valve opening 56a through a plurality of ports 90a into the cap-like cavity 72a, into bore 62a in the male member 36. This flow is represented by arrows 92a. The bore 62a is threadably connected to control line 12a as shown in FIG. 3.

However, when there is a disconnection of the connector 16 from the mandrel 20 and the seal of the cone seal 46 is broken, the valves V1 and V2 will close due to the bias of the helical springs 74 and 74a. Also, because of the shape of the nose cones 80 and 80a, only a minute amount of seawater (approximately 1 cc) will intrude into the control lines upon reconnection (remating) of the members 36 and 40. In the application of this invention, the control line 12 has a fluid pressure level of about 50 psi and the spring 74a in valve V2 has a heavier spring load than the spring 74 in valve V1 so that upon the original connection and upon reconnection after a disconnection, the valve V1 will open first to purge (wash) any seawater in the cone seal arc.

In order to provide this double acting valve system 10 with a fail-safe feature, the nose cone 80a is threadably inserted into a bore 96 in the valve V2 in lieu of the machine screw 86 of valve V1. This allows the incorporation of the valve FSC into the valve V2. To do this, the bore 96 is conically tapered to form a tapered valve seat 100 for a valve poppet 102 which is spring biased against the valve seat 100 by a helical spring 104. Thus, poppet 102 is biased in the same direction as the nose cone 84 of the valve V1. A valve cavity 106 for the poppet is formed by the nose cone 80a and the valve seat 100. This valve cavity 106 is in communication with the ambient pressure, i.e., seawater pressure, when valve V2 is opened, by a bore 110 in the nose cone 80a and is in communication with the fluid in the cup-like cavity 72a and downstream bore 62a by a bore 112. Thus, the fail-safe valve FSC will be closed when the two members 36 and 40 are engaged and when the two nose cones 80 and 80a are in engagement. These nose cones will also block bore 110. If separation of the connector occurs, however, and the primary valves V1 and V2 close, the fail-safe close valve FSC will act as a pressure relief valve allowing the hydraulic valve actuator A, such as shown in FIG. 1 to close the subsea valve SS. When the valve piston (not shown) of the subsea valve bottoms out in response to the spring S in the subsea valve SS, line pressure in control line 12a equalizes with ambient pressure and the fail-safe valve FSC closes. Thus, no seawater intrusion will occur in the control circuit via either the primary valves V1, V2 or the fail-safe close check valve FSC.

From the foregoing, it is apparent that the valve V2 is actually a mechanically openable valve with a one-way safety check valve therein so it becomes apparent that this invention may be incorporated in a tree cap/running tool application which utilizes stabs and receptacles instead of face-to-face cone seals.

Figure 6:
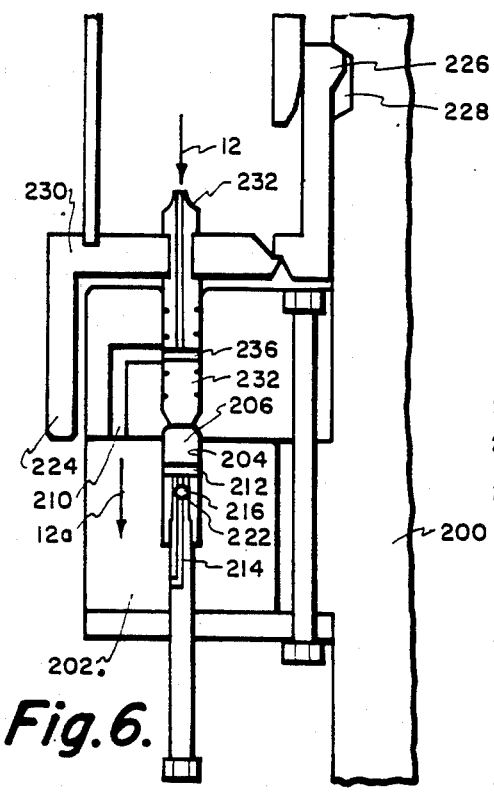
FIG. 6 illustrates schematically a stab/shuttle valve in a disconnected position.
Figure 7:
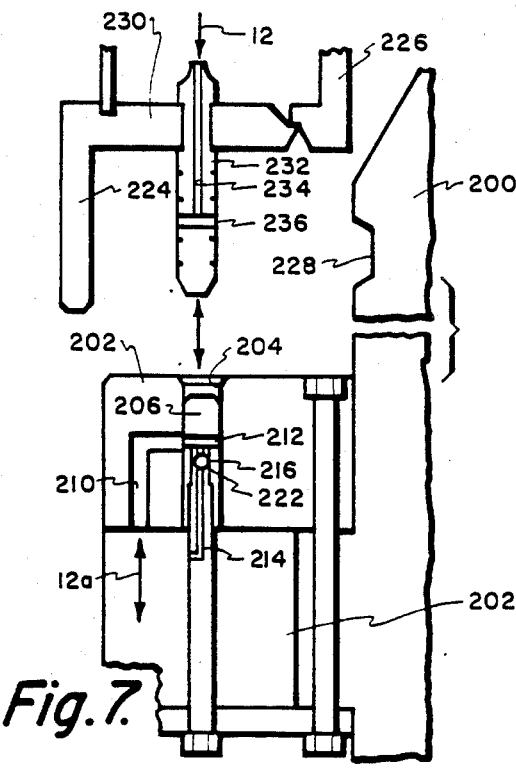
FIG. 7 illustrates schematically the stab having opened the shuttle valve to connect the control lines to subsea valves.

Thus, turning now to FIGS. 6 and 7, which are schematic illustrations to simplify the disclosure and description, there is illustrated a typical tree mandrel 200 with a manifold ring 202 attached thereto in any suitable manner and containing a plurality of main bores 204 (one being shown in these figures) forming valve chambers for a shuttle type valves 206 to reciprocate therein. These bores are spaced apart and circumferentially disposed about the manifold ring 202. Each bore 204 is in communication with control lines 12 and 12a by fluid passages 210 opening into the main bore 204. The shuttle valve 206 (only one also being shown) has both a radial bore 212 and an axial bore 214. The radial bore 212 is in communication with the control line 12a when the shuttle valve 206 is in its closed position, as shown in FIG. 7, thereby venting any locking pressure that might be in the control line to ambient pressure through the one-way safety valve 216 located within the axial bore 214. This safety valve 216 comprises a poppet 222, spring-actuated toward a closed position in a manner similar to the safety check valve FSC, previously described. (The spring is not shown.)

Also shown is a tree cap 224 latchable onto the tree mandrel 200 by a radially inwardly extending latching means 226 on the tree cap which engages a suitable profile 228 in the tree mandrel. This tree cap 224 has a plate 230 containing suitable stabs 232, the purpose of which are to stab into the bores 204 and move the shuttle valve 206 towards an inactive position, thus opening the control lines 12a to the control lines 12 from the rig for operating the various valve actuators on the tree. As shown, the stab 232 has an axial bore 234 and a radial bore 236 connected thereto for communication with the fluid passage 210 when fully stabbed into the bore 204. Reference can be made to the U.S. Pat. No. 4,497,369 to Hurta, et al for more detailed information about hydraulic control of a subsea tree.

It is also apparent even from these schematic illustrations that no seawater intrusion will occur on the disconnection of the tree cap and only a predetermined amount will occur during reconnection.

Finally, while the foregoing discusses a tree cap, the same type of plate, such as 230, and latching means 226 may also be part of a running tool for serving the well.

Figure 8:
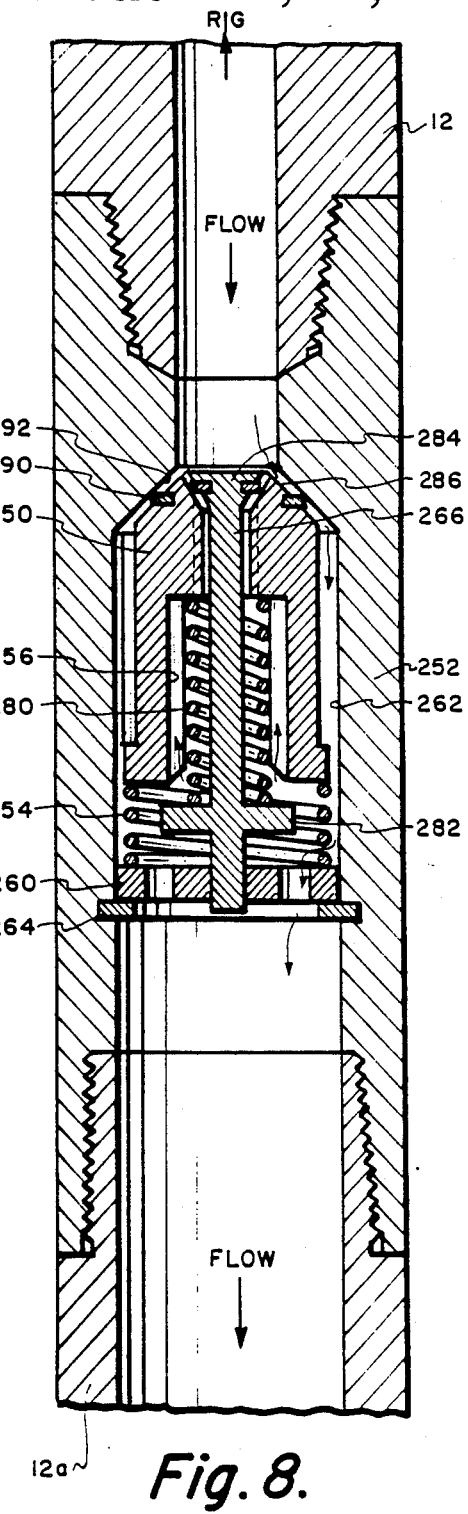
FIG. 8 illustrates a one-way check valve openable in response to fluid pressure together with a one-way safety check valve incorporated therein.

Referring now to FIG. 8 showing a one-way primary check valve 250 similar to valve V2, supra, in a valve body 252 connected in the control lines with the flow of fluid from the rig to the valve control actuators subsea except that this valve is openable by fluid pressure in the line 12 against the bias of the spring 254. This valve differs from V2 in that the spring 250 is outside the cup shaped cavity 256 and reacts against a base 260 held within the valve cavity 262 by a split ring 264. As in the case of valve V2 of the prior figures, this valve 250 also has a one-way valve 266 located partly within the cup-shaped cavity 256 with a spring 280. Spring 280 is located within the cup shaped cavity 256 and engages a shoulder 282 on a stem 284 of the valve 266 and at the other end against the primary valve body 250. This one-way valve 266 in a safety valve operates in a direction against the fluid pressure entering the valve cavity 262, as in the case of the prior fail-safe check valves, except this valve is a conical type valve with a conical nose 284, located at the nose 286 of the primary valve, and having a seal disc 290 engaging a conical seat 292 in the primary valve. Thus, while in the case of the prior fail-safe check valves, supra, which were mechanically closed, this case fail-safe check valve 266 is closed by the same fluid pressure which opens the primary valve. On the other hand, assuming a disconnection somewhere in line 12 and loss of pressure therein, closing the primary valve by the bias of the spring 280, if there is a locking pressure downstream in the control line 12a, this safety valve 266 will open in response to such pressure and allowing the line to vent. The calibration of spring 280 is such that closing of the safety valve will occur after the line 12a has been vented, thus preventing hydraulic lock in line 12a.

Figure 9:
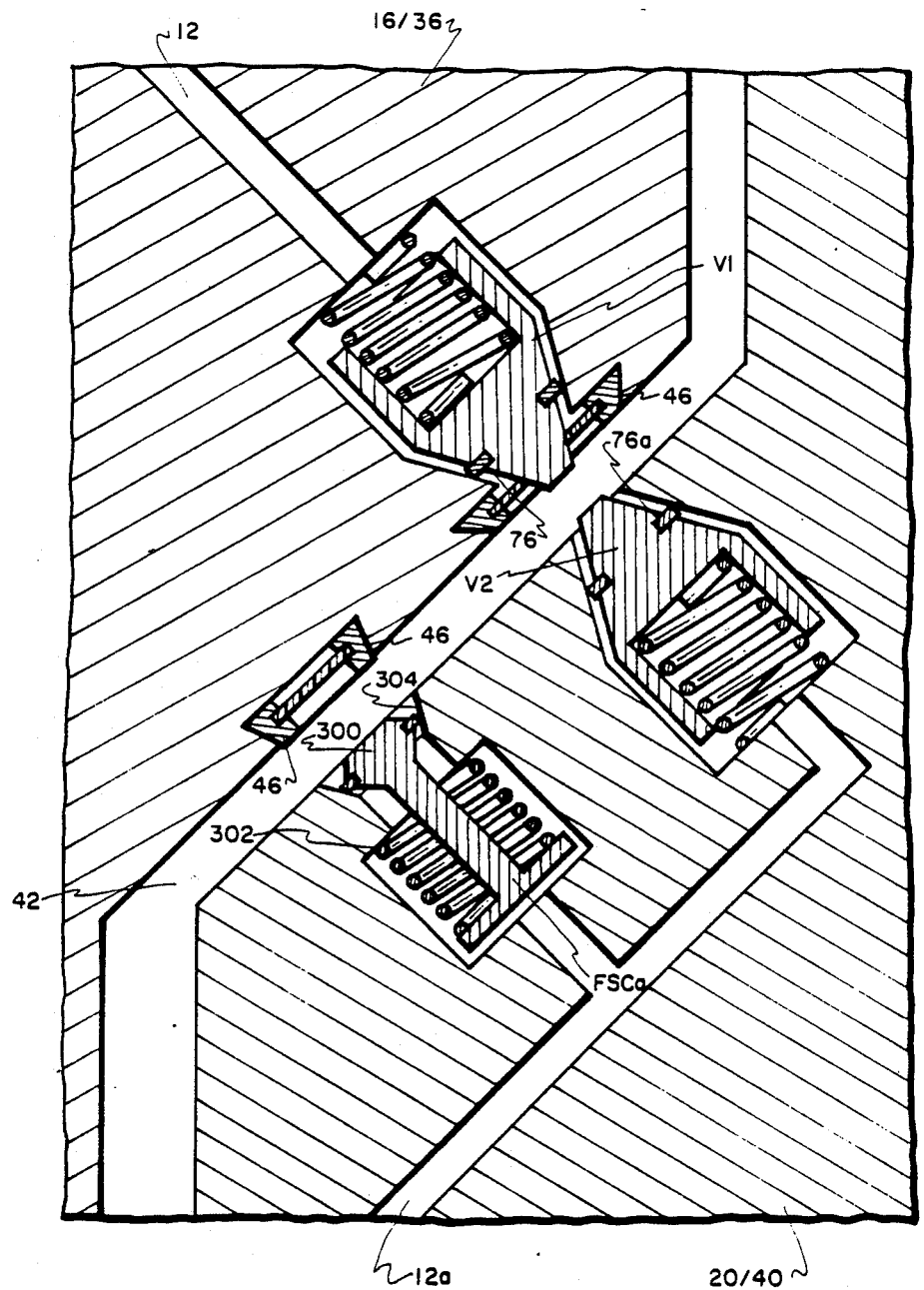
FIG. 9 illustrates schematically still another embodiment of the invention with the one-way safety check valve located to one side of the double acting one-way check valve system.

Finally, as shown in FIG. 9, the double acting cone seal valves V1 and V2 of FIGS. 3 and 4 are again shown in a connector 16 and mandrel 20 at the member interface 42 between the member 36 and 40. These valves V1 and V2 are given the same reference numerals as in FIGS. 3 and 4 since they are substantially identical except that in this embodiment the one-way safety check valve FSCa is located to one side of valve V2. This valve FSCa in this embodiment is a stem valve with a stem 300 held closed by the bias of spring 302 against a conical valve seat 304 in the member 40. The member 36 has an additional cone seal 46 to seal against leakage at the member interface 42 but such cone seal will not mechanically open the safety valve FSCa. Thus, except for the location of the safety valve FSCa and the extra cone seal, all other components of the valve system are the same and given identical reference numbers and letters to simplify the description thereof.

I claim:

1. A valve system for controlling the flow of fluid under pressure between two members adapted to be connected together at an ambient pressure subsea comprising,
   the first member of said two members having a primary valve with a spring urging said valve to a position whereby said flow between said members is prevented when said two members are disconnected,
   means in the second of said two members for moving said primary valve to a second position when said two members are connected together so that flow of fluid under pressure through said two members may occur, and
   means in one of said members for venting directly to said ambient pressure and to the exterior of said one member excess fluid pressure differential that might exist in one of said members as the result of the flow of fluid under pressure through said members when said members become disconnected after having been connected.

2. The valve system as claimed in claim 1 wherein said means for moving said primary valve to said second position comprises valve means which engages said primary valve to move said primary valve against the bias of said spring.

3. The valve system as claimed in claim 2 wherein said means for venting comprises a one-way check valve located to vent said excess pressure directly to ambient pressure outside said one member.

4. The valve system as claimed in claim 3 wherein said one-way check valve is located in said primary valve.

5. The valve system as claimed in claim 1 whereas said means for moving said primary valve to said second position comprises fluid under pressure from a conduit communicated to said primary valve to move said primary valve against the bias of said spring.

6. The valve system as claimed in claim 5 wherein said means for venting comprises a one-way check valve located to vent said excess pressure directly to ambient pressure outside said one member.

7. The valve system as claimed in claim 6 wherein said one-way check valve is located in said primary valve.

8. The valve system as claimed in claim 1 wherein said means for moving said primary valve to said second position comprises a stab means which engages said primary valve to move said primary valve against the bias of said spring.

9. The valve system as claimed in claim 8 wherein said means for venting comprises a one-way check valve.

10. The valve system as claimed in claim 9 wherein said one-way check valve is located in said primary valve.

11. A double-acting check valve system for controlling the flow of fluid under pressure at the interface between two members adapted to be connected together at an ambient pressure subsea comprising,
    the first member of said two members having a first one-way valve with a spring urging said first valve closed against ambient pressure when said two members are disconnected,
    the second member of said two members having a second one-way valve with a spring urging said second valve closed against ambient pressure when said two members are disconnected,
    means on said valves for opening said valves when said two members are connected together for the flow of fluid under pressure through said two members,
    said valves being operable in opposite directions, and
    means in one of said member for venting directly to said ambient pressure and to the exterior of said one member excess fluid pressure that is greater than ambient pressure that might exist in one of said members as the result of the flow of fluid under pressure through said members when said members become disconnected after having been connected.

12. The valve system as claimed in claim 11 wherein said means for venting is incorporated within said second valve and openable directly to said ambient pressure outside said second valve.

13. The valve system as claimed in claim 11 wherein the spring bias of the valve in the second member is greater than the spring bias of the valve in the first member so that said valve in said first member will open before the opening of the valve in the second member.

14. The valve system as claimed in claim 11 wherein valves in both said members are mounted on conical mating members with a face-to-face type seal such that salt water intrusion amounts are greatly limited.

15. The valve system as claimed in claim 11 wherein a selected pressure above ambient conditions, at the point of submersed interfacing, can be applied to further reduce seawater intrusions to zero or close to zero.

16. In a conical type subsea connector used at an ambient pressure subsea comprising a first bell-shaped connector member with a first conical surface and a second cone-shaped connector member with a second conical surface, both surfaces being adapted to engage in sealing relationship, said first connector member having a plurality of conduit means connectable to a source of fluid under pressure, each said conduit means being transverse said first connector member and defining opening means in said first conical surface, sealing means on the surface of said first conical surface and surrounding said opening means and adapted to prevent leakage between an interface formed by said two conical surfaces when said conical surfaces are brought into engagement, said second connector member having a plurality of conduit means, each said second conduit means being transverse said second connector member, and defining second opening means in said second conical surface, each said second conduit means being connectable to function valve means to perform a hydraulic function subsea, and said second conduit means being in coaxial alignment with said first conduit means when said connector members are brought into engagement, the improvement in a valve system for controlling said flow of fluid under pressure between said two connector members comprising, a first valve means with a spring urging said first valve means to a position whereby flow through said first connector member is prevented when the two connector members are out of engagement, means in one of said two connector members for moving said first valve means to a second position so that the flow of fluid under pressure through said conduit may occur when said two conical surfaces are engaged, and a one-way check valve in said conduit for venting excess pressure differential that might result when said connector members are disconnected after having been connected directly to said subsea ambient pressure located outside said connector members.

17. The improvement as claimed in claim 16 wherein said means for moving said first valve means to a second position comprises second valve means in said second connector means.

18. The improvement as claimed in claim 17 wherein said first and second valve means have valve body means which have passages through which fluid under pressure flows from said first conduit means to said second conduit means.

19. The improvement as claimed in claim 18 wherein each valve body means terminates near said conical surfaces in conically formed tips which engage to open said passages and act to define with said conduit means the amount of sea water intrusion when said valve means become disconnected.

* * * * *